MULTI-APERTURE PLATE LOGIC

Filed Jan. 9, 1962 4 Sheets-Sheet 1

INVENTOR
GEORGE F. MC LANE

BY David Lesclune

AGENT

DURING SET ONLY TIME

DURING RESET TIME

DURING INHIBIT ONLY TIME

DURING RESET TIME

DURING SET INHIBIT TIME

DURING RESET TIME

United States Patent Office 3,253,268
Patented May 24, 1966

3,253,268
MULTI-APERTURE PLATE LOGIC

George F. McLane, Philadelphia, Pa., assignor to Sperry Rand Corporation, New York, N.Y., a corporation of Delaware Filed Jan. 9, 1962, Ser. No. 165,172
24 Claims. (Cl. 340—174)

This invention relates to logical devices employing magnetic materials and more particularly to multi-aperture plate logical devices.

Ferro-magnetic or simply magnetic materials have gained wide use in the information handling field because of their capability of being magnetized to saturation in either of two directions. These materials exhibit a so-called squared hysteresis characteristic which assures that after the core has been saturated in either direction, a definite point of magnetic remanence representing the residual flux density in the core will be retained for either of these two directions. These two points of magnetic remanence are the two stable conditions in the core which can be used to represent, for example, storage of binary information, i.e. one remanent state to represent a "1" and the other to represent a "0."

The most widely used of these magnetic material devices is the well-known toroidal core. Extreme reliability, stability, and ease of maintenance have led to its wide use in magnetic memory matrices, delay lines, and logic circuits. In some of these applications, large numbers of cores, windings, diodes, matching transformers, and capacitors must be employed to insure that only the required switching currents or voltages are applied to selected cores and to prevent the application of undesired back currents and voltages caused by the desired switching. The employment of such devices has increased the cost, decreased the switching times available, and increased greatly the power requirements.

One of the solutions to the problem set forth above, with respect to employing multiple magnetic cores, is the use of multi-aperture magnetic plates which permit a reduction in the number of inter-connecting windings and permit elimination of many of the transfer loops that are required in these individual core devices. It is therefore an object of this invention to provide a novel form of multi-aperture magnetic plate logic device which overcomes the difficulties of the known core circuits.

It is another object of this invention to provide a single multi-aperture magnetic plate which may be employed for more than a single logical function.

Still another object is to provide a multi-aperture magnetic plate which can be used for two or more logical functions simultaneously.

Yet another object of this invention is to provide a plurality of multi-aperture magnetic plates so connected that they may be employed for various logical functions.

In practicing this invention, there is provided one or more multi-aperture magnetic plates. Each of these plates has a central aperture and further apertures, each located on radial lines from the center of the device. The apertures are so placed as to result in a plurality of equal-sectional magnetic legs. These legs are threaded in various combinations by set, reset, and inhibit input windings and a plurality of output sense windings. Output signals are produced in the output sense windings according to the condition of the flux change in the particular leg they are arranged to sense. An output signal is thus available to indicate satisfaction of the logical configuration which the plate represents.

Other objects and features of the invention will be pointed out in the following description and claims and illustrated in the accompanying drawings, which disclose, by wa yof example, the principle of the invention, and the best modes which have been contemplated for carrying it out.

Figure 4:
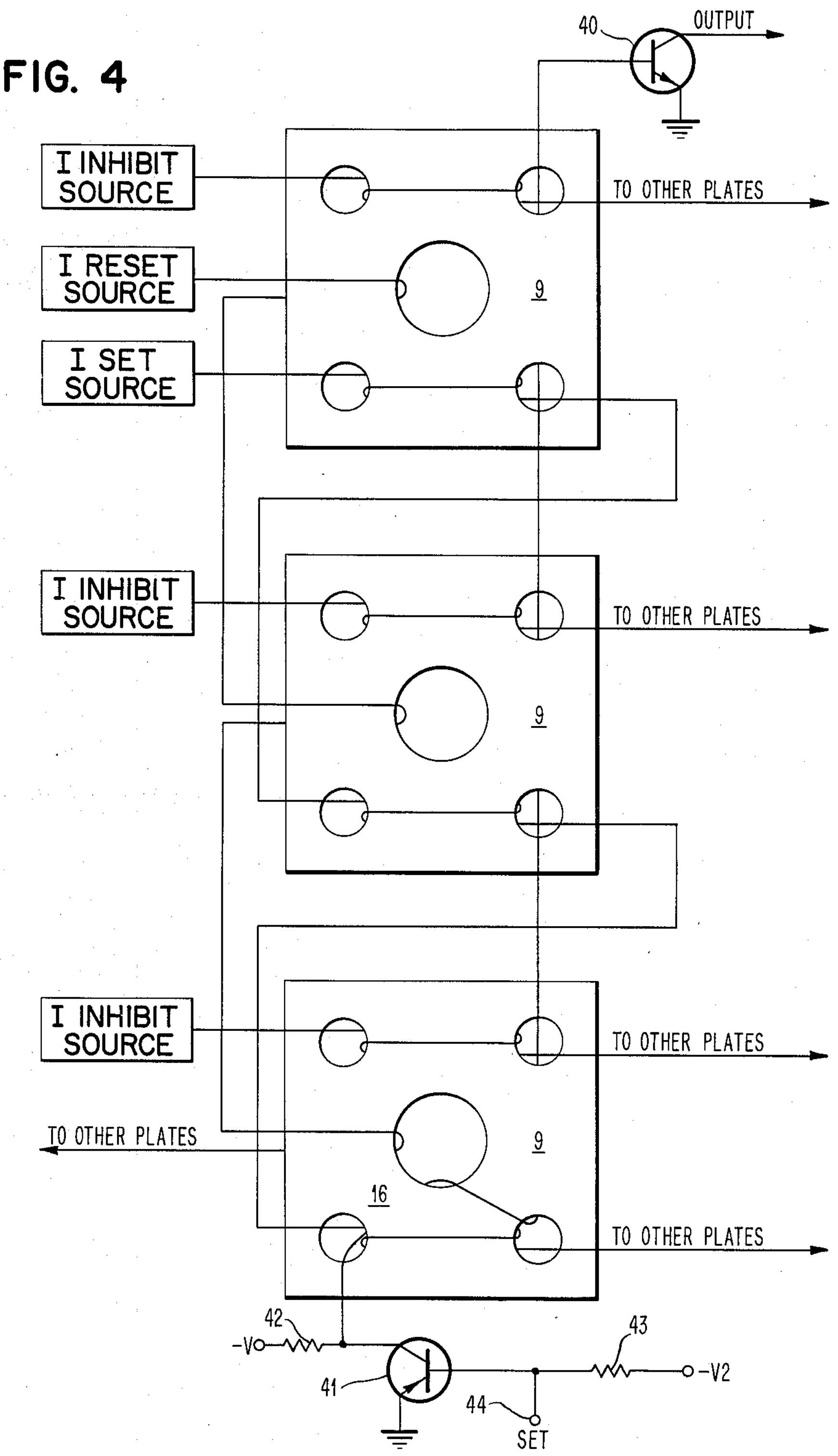
Figure 5:
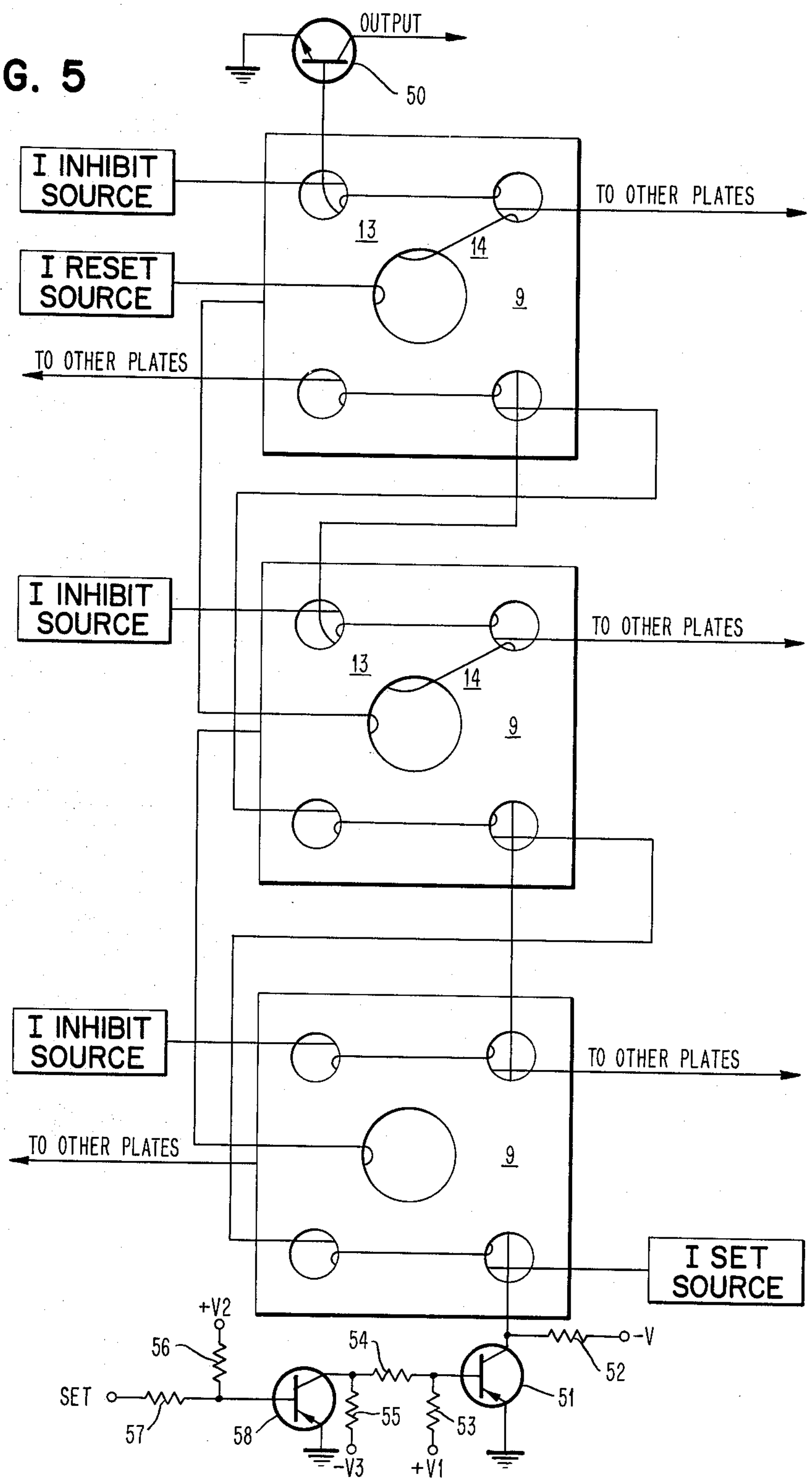

FIGURE 3, composed of FIGURES 3*a*, 3*b*, 3*c*, 3*d*, and 3*f*, illustrates the flux patterns within the plate for various input conditions;

FIGURES 4 and 5 show how the basic plate may be employed in logical switching arrangements.

Similar reference characters refer to similar parts of each of the several drawings.

Figure 1:
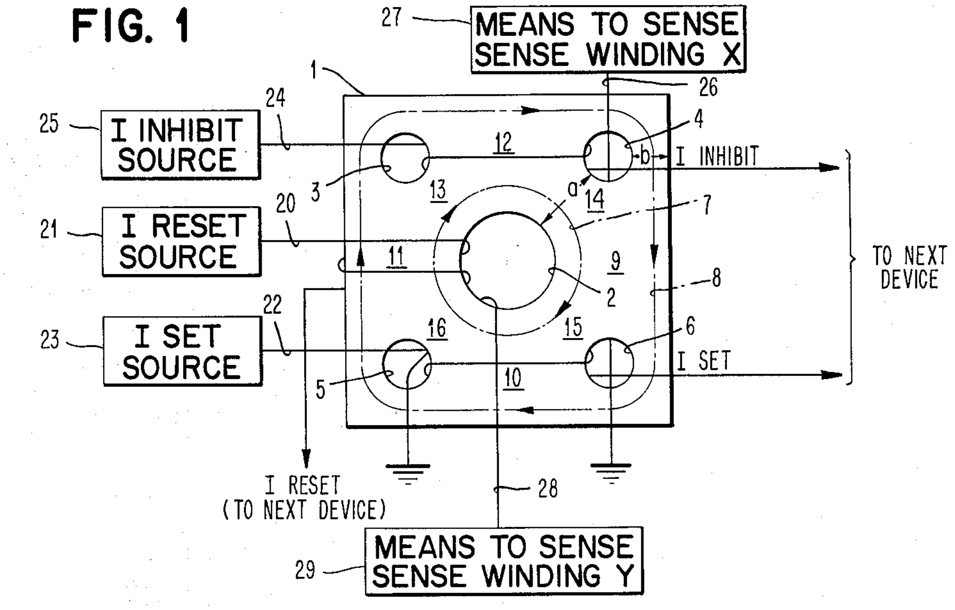
FIGURE 1 is a view of the basic plate configuration employed in this invention.

Referring to FIGURE 1, there is shown a multi-aperture magnetic plate generally designated as 1. This plate contains a central aperture 2 and a plurality of further apertures 3, 4, 5 and 6. These further apertures are located with their centers on a circle which is concentric with the central aperture. The diameter of this circle, on which the centers of the further apertures are located, is chosen so that the distances *a* and *b* are equal. The placement of these apertures will cause, under proper input conditions, the establishment of two major flux paths. The first of these paths 7, is concentric with the central aperture and passes inside of the apertures 3, 4, 5 and 6. This path 7 saturates the magnetic legs 13 (between the central aperture and the aperture 3), 14 (between the central aperture and the aperture 4), 15 (between the central aperture and the aperture 6), and 16 (between the central aperture and the aperture 5). The second of these paths 8, is also generally concentric with the center aperture but passes outside of the apertures 3, 4, 5 and 6. A further magnetic leg 9 exists between apertures 4 and 6; whereas, magnetic leg 10 exists between apertures 5 and 6. Magnetic leg 11 exists between apertures 3 and 5, and magnetic leg 12 exists between apertures 3 and 4. A two turn reset winding 20 is placed over magnetic leg 11 and through the central aperture 2. This winding 20 is supplied with a reset current from a reset current source 21. The other end of winding 20 may be returned to the reset current source 21 or connected to further plate elements. A single turn set winding 22 is wound about magnetic leg 10 through apertures 5 and 6. The winding is connected to a set current source 23 at one end while the other end may be used to conduct set current to other similar devices. A single turn inhibit winding 24 is wound about magnetic leg 12 through apertures 3 and 4. This winding is connected at one side to an inhibit current source 25 while the other end may be returned to this source or employed to supply inhibit current to other devices. An *x* output signal sense winding 26 is threaded through aperture 4 under magnetic leg 9 through aperture 6 to ground. The other end of the *x* sense winding is attached to a sensing means 27. A *y* sense winding 28 is threaded over magnetic leg 10 through central aperture 2 under magnetic leg 16 and through aperture 5 to ground. The other end of winding 28 is connected to a *y* winding sensing means 29. The purpose of the *x* sense winding is to sense a flux change in magnetic leg 9 whereas the *y* sense winding is used to sense a flux change in magnetic leg 16.

Figure 2:
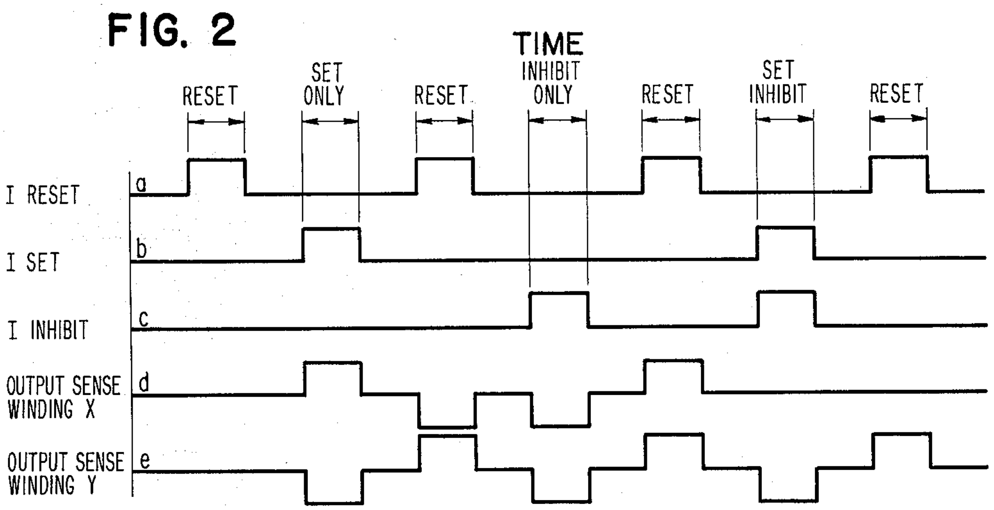
FIGURE 2 is a timing diagram which illustrates the relative timing of the application of the various input pulses and the output pulses.

Referring now to FIGURE 2, there is shown a timing diagram illustrating the application of the various input pulses to the core of FIGURE 1, as well as the resulting output pulses from an *x* sense winding and a *y* sense winding. Line *a* of FIGURE 2 illustrates the application of reset pulses.

Line *b* of FIGURE 2 illustrates the application of the set pulses, while line *c* of FIGURE 2 illustrates the application of inhibit pulses. Lines *d* and *e* of FIGURE 2 illustrate the outputs appearing on the *x* sense winding and the *y* sense winding respectively. By comparing the time of application of various pulses, it can be seen:

(1) That reset pulses are applied alternately with other types of pulses, (2) That the set and inhibit pulses are applied simultaneously during one type of operation, but (3) All other pulses are applied alone.

In order that the operation of the device of FIGURE 1 be understood, reference is now made to FIGURE 3. Assuming that a reset pulse has been applied by reset source 21 to the reset winding 20 of FIGURE 1, the flux pattern along paths 7 and 8 shown in FIGURE 1 is established. It will be assumed for the purposes of this description that the flux directions indicated by the arrowheads on the paths 7 and 8 are positive and that in leg 9 flux passing from right to left is positive. However, it should be understood that any other convention could be assumed with proper adjustment of the output voltage polarities. Upon the application of a set-only pulse, in other words, a set pulse on line 22 from the set source 23, a flux pattern such as shown in FIGURE 3*a* is established. It can be seen that there is a positive change of flux in the magnetic leg 9 whereas the direction of the flux has been reversed negatively in leg 16. This positive change of flux in the leg 9 is responsible for the positive output voltage induced on the output winding 26, whereas the negative change of flux in the leg 16 is responsible for the negative output voltage being induced in the *y* sense winding 28. The application of the next reset pulse causes the original flux pattern as shown in FIGURE 1, to be re-established. This is shown in FIGURE 3*b*. As a result of this flux change, the flux formerly threading magnetic leg 9 is changed to zero or changed in the negative direction resulting in a negative output voltage. The flux through magnetic leg 16 has also been changed. It, however, has been changed in a positive direction thereby giving rise to the positive output voltage, in the *y* sense winding. These outputs are shown by lines *d* and *e* of FIGURE 2. During the inhibit-only time, a pulse is applied by the inhibit current source 25 on the winding 24, which results in the flux pattern shown in FIGURE 3*c*. A negative output voltage is induced in the *x* sense winding due to the negative change of flux in the magnetic leg 9, whereas a negative output voltage is induced in the *y* sense winding due to the negative change of flux in the leg 16. These output voltages are shown by lines *d* and *e* of FIGURE 2. The reset pulse applied following the inhibit-only time results in the re-establishment of the original flux pattern as shown in FIGURE 3*d*. The effect of the reset pulse is to cause a positive return to zero of the flux in the magnetic leg 9 thereby inducing a positive output pulse in the *x* sense winding. At the same time the flux threading the magnetic leg 16 has been changed in direction resulting in a positive output voltage at the *y* sense winding. These outputs are illustrated by lines *d* and *e* of FIGURE 2. In the following time period, a set and inhibit pulse are applied at the same time to the windings 22 and 24 from sources 23 and 25 respectively. This results in the flux pattern shown in FIGURE 3*e*. No voltage is induced in the *x* sense winding due to the fact that the flux about aperture 4 through magnetic leg 9 is equal and opposite to the flux about aperture 6 also through magnetic leg 9. This results in a zero net output voltage being developed in the *x* sense winding 26. On the other hand, there has again been a reversal of the flux through the magnetic leg 16 in a negative direction resulting in the negative output voltage as shown by line *e* of FIGURE 2. The final reset pulse again causes the establishment of the flux pattern shown in FIGURE 1, that is the loops 7 and 8. Again, since the flux threading magnetic leg 9 due to the set-inhibit pulse application at the apertures 4 and 6 are equal and opposite, when these are returned to their normal condition the net change is again zero resulting in a zero net output voltage being developed in the *x* sense winding 26. The flux through magnetic leg 16 is again reversed, this time in a positive direction resulting in the positive output voltage shown by line *e* of FIGURE 2. Thus, it can be seen that a positive output voltage is generated at the *x* sense winding upon the application of a set-only pulse following a reset pulse and at the application of a reset pulse following an inhibit-only pulse, whereas, a negative output voltage is found there upon the application of the reset pulse following a set-only pulse or an inhibit-only pulse following a reset pulse. It should further be noted that an output voltage is found at the *y* sense winding at all pulse times of the operation. The polarity of this output voltage, however, is dependent upon the type of pulses which have been applied to the plate. Thus the output of the *y* sense winding may be employed as a clock pulse source for the remaining circuitry of the system the plate is used in.

The output of the *x* sense winding may be used to furnish the "Exclusive—Or" logical function, which produces an output if one and only one of the two inputs is present but no output if both of the inputs are present. The output signal at terminal 26, if its polarity is not determined, will indicate whether or not a single signal is present or not at the inputs of the plate, whereas, if the polarity of the signal is determined, which of the input signals was applied is readily indicated.

Assuming the two input signals to the "Exclusive—Or" to be the set-only and the inhibit-only pulses, it can be seen from a consideration of line *e* of FIGURE 2, that a positive output will be found at terminal 26 if the set-only pulse is applied, a negative output will be found if the inhibit-only pulse is applied, and that no pulse is found at terminal 26 if both the set and inhibit pulses are coincidently applied.

If it is desired to determine which of the two inputs have been applied, then the sense means 27 should provide different indications for these two output conditions. However, if the mere fact of the presence of one of the two input signals is all that is to be noted, then the device 27 may be of the type that will provide an output regardless of the polarity of the input to it.

It should be noted that the particular manner of winding the *y* sense winding, through apertures 5 and 2, is included for exemplary purposes only. A similar output or clock pulse may be achieved if the sense winding is placed through the apertures 3 and 2, 5 and 6, placed through the aperture 2 encircling leg 9, or placed through aperture 6. The choice of the particular arrangement of the *y* sense winding is determined by the use to which a device is put.

FIGURE 4 illustrates a logical gate employing 3 of the five aperture plates as shown in FIGURE 1. Each of the three plates has a reset input winding, an inhibit input winding, and a set input winding similar to that shown in FIGURE 1. In addition, each of the three plates has an *x* sense winding, but only the last of the three plates has a *y* sense winding. The reset windings of all three plates are connected in series to a common reset source 21. The set windings are also connected in series to a common set current source 23. The inhibit windings of the separate plates are not connected together (FIGURE 4). These may be connected to plates in other gating arrangements. The manner of application of the pulses by the respective sources is similar to that described and shown with reference to FIGURE 3. The *x* sense windings of all three plates as well as the *y* sense winding of the last of the three multi-aperture plates are connected in series. At one end of this series sense line there is connected an NPN transistor 40 connected in a grounded emitter type of configuration. The gate output is the collector current of this transistor. The opposite end of the sense winding is connected to a PNP transistor 41 also arranged in a grounded emitter configuration. The collector is tied through a resistor 42 to a large negative supply −V while the base is tied to a small negative supply −V2 through resistor 43. The seet only pulse is applied to the base of transistor 41 via terminal 44. During all time periods except the set only period, the base is sufficiently negative to permit the transistor 41 to conduct and thus apply a ground potential to the base of transistor 40, making it responsive to any positive voltages which might be induced in the sense winding of the three plates. However, during the set period, the positive set pulse is applied to the base of transistor 41 overcoming the effect of the negative supply through resistor 43. This causes the transistor to be turned off and permits the application of a high negative voltage to the base of transistor 40 which would render it non-responsive to any positive voltages induced in the sense winding.

Figure 3A:
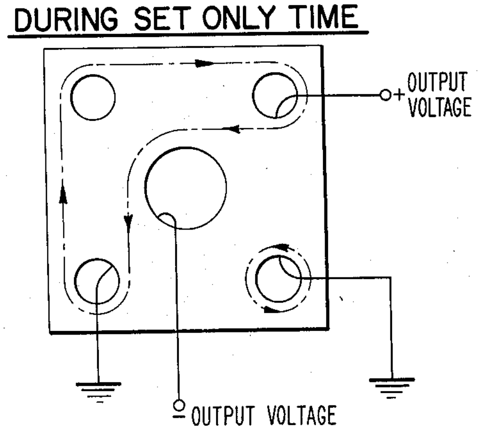
Figure 3B:
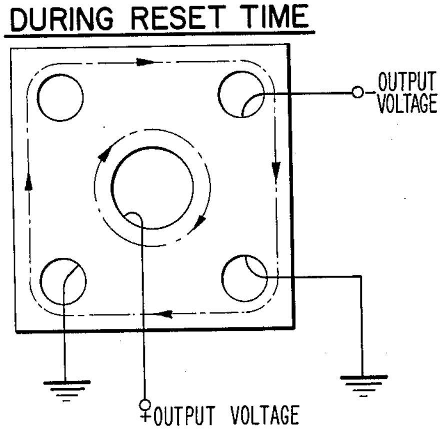
Figure 3C:
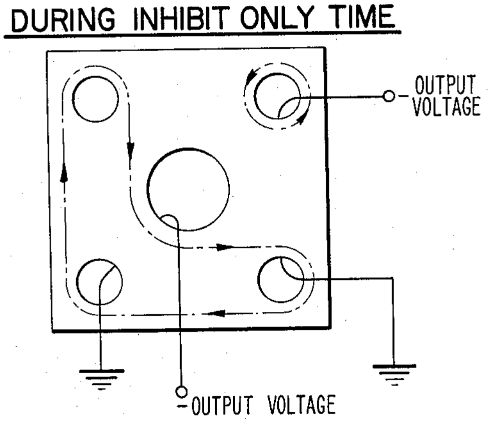
Figure 3D:
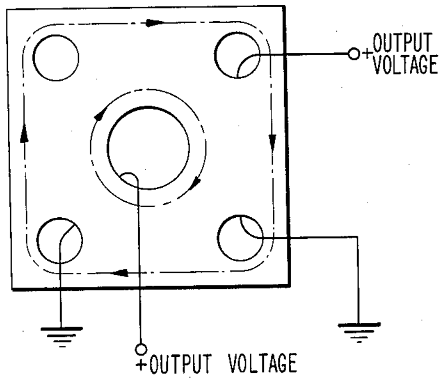
Figure 3E:
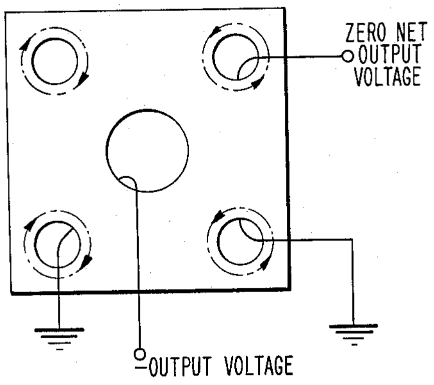
Figure 3F:
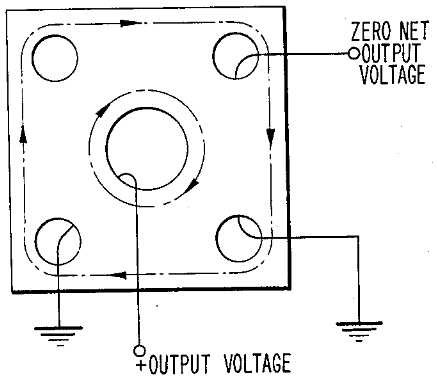

As was set forth above with respect to FIGURES 3*a* and 3b, the *x* sense winding produces a negative output when the reset pulse is applied following a set only pulse. With respect to FIGURES 3*e* and 3*f*, it was pointed out that there was no *x* sense winding output pulse in the time period for the reset following a set-inhibit time period. Also, it was shown that the *y* sense winding was positive in both of these instances. Thus, the circuit of FIGURE 4 operates in the following manner: If no inhibit pulse is present upon the inhibit winding at the same time a set pulse is applied through the set winding, upon the occurrence of the next reset pulse on the reset line, a negative pulse will be produced in each of the three *x* sense windings of the three respective plates. At the same time, a single positive pulse will be induced in the *y* sense winding. Since these outputs are in series, the net effect is to apply a negative value pulse two times the value of the pulse induced in a single *x* sense winding to the base of the transistor 40. This negative pulse will cause the transistor to remain cut off and prevent any output from the collector. If, however, an inhibit pulse is applied to each of the three separate plates at the same time a set pulse is applied, then, during the following reset period, no voltage will be induced in the *x* sense winding as shown by FIGURE 3*f*. However, the positive pulse generated in the *y* sense winding will be sufficient to turn the transistor on and cause an output at the collector. Thus it can be seen that in order to produce any output from transistor 40, it is necessary that inhibitng current be introduced into each one of the separate magnetic plates. Anything less than this will cause the transistor to remain cut off, producing no output.

This circuit may be employed as a form of gated AND circuit. Each of the three inputs will be respectively supplied through an associated one of the inhibit input windings while the reset pulse is used to trigger the operation of the gate. An output from transistor 40 indicates that all of the input signals to the gate are present whereas no output indicates that one or more of the input pulses is absent.

FIGURE 5 illustrates a variation of the gated AND circuit shown in FIGURE 4. The inhibit, reset and set windings are connected in a manner similar to that shown and described with reference to FIGURE 4. However, the direction of the set current has been reversed in FIGURE 5 with respect to that shown in FIGURE 4. In this circuit, all of the multi-aperture devices have their *x* sense windings arranged in a manner similar to that shown in FIGURE 1, while the *y* sense windings which are used in only two of the gating devices, are used to sense the flux change in magnetic leg 13 instead of 16 as shown in FIGURE 1. Tracing the sense winding, it is seen that the winding goes through aperture 3 of the first multi-aperture device under magnetic leg 13 through central aperture 2 over magnetic leg 14 through aperture 4 under magnetic leg 9 through aperture 6 to the following multi-aperture device where a similar tracing is made. In the final of the three multi-aperture devices, no provision is made for a *y* sense winding and the *x* winding is threaded merely through apertures 4 and 6 under magnetic leg 9 and to the output device. This output device consists of an NPN transistor 50 arranged with a grounded emitter, the output being taken from the collector. At the other end of the sense winding, it is connected to a PNP transistor 51 also arranged with a grounded emitter.

The collector of transistor 51 is tied to a negative supply −V through a resistor 52 which will provide sufficient voltage to keep the base of transistor 50 negative, keeping it turned off, during any period that the transistor 51 is turned off. The base of transistor 51 is tied to a positive potential +V1 through resistor 53 and to the collector of transistor 58 through resistance 54. The collector of transistor 58 is tied to a negative potential −V3 through resistor 55. In this way the resistors 53, 54 and 55 acts as a voltage divider to permit a proper negative bias to be applied to the base of the transistor 51 to permit it to be turned on during all periods that a set pulse is not applied to the base of transistor 58. The conduction of transistor 51 applies ground to the base of transistor 50 allowing it to respond to the voltages induced in the sense windings. Finally, the transistor 58 is arranged as an inverter circuit with the base tied through resistor 56 to a positive supply +V2 while also being tied through resistor 57 to the negative set-only pulse. When no set pulse is present, the positive voltage impressed on resistor 56 keeps the base of transistor 58 high and turned off. But when a negative set-only pulse is applied, the base is driven negative permitting the transistor 58 to be turned on and supply a positive output to the base of transistor 51 which is thereby turned off, permitting the high negative voltage present on resistor 52 to be applied to the base of transistor 50 preventing its being turned on in response to positive voltages induced in the sense windings. In this arrangement, the outputs of the *y* sense windings are negative during all the reset times. The outputs of the *x* sense windings are positive during the reset time which follows the set-inhibit time and are zero during the reset time which follows the set only time. When inhibit currents are present at all three plates, the voltage applied to the base of the transistor 50 consists of the three positive outputs of the *x* sense windings and the two negative outputs of the *y* sense windings causing transistor 50 to be turned on. If inhibit current is not present at all of these plates, then the positive outputs of the *x* sense windings are cancelled by the *y* sense winding negative outputs and the transistor 50 is not turned on. Thus, this device is another way of obtaining the gated AND circuit. If more than one inhibit current is supplied as an input to a plate, then these inhibit currents will form a logical "or" gate.

The basic principles as set forth in FIGURES 4 and 5 and the explanations pertaining thereto can be extended as much as desired. These devices may be used as the basis of majority logic devices. Majority logic devices require that a certain number of inputs of a certain type be present before an output is produced. Thus, in the examples above, a required number of inputs are necessary to the various inhibit windings in order that an output be produced. In one instance, three positive inhibit pulses were necessary in order that a single positive pulse be permitted to turn the transistor on. In the second instance, it was necessary to have a number of positive pulses so that the total number of positive pulses through the transistor would exceed the total number of negative pulses thereby turning the transistor on. This could be extended so that for example, seven out of ten inputs might be necessary in order that the gate operates.

While there have been shown and described and pointed out the fundamental novel features of the invention as applied to the preferred embodiments, it will be understood that various omissions and substitutions and changes of the form and details of the devices illustrated and in its operation may be made by those skilled in the art, without departing from the spirit of the invention.

What is claimed is:

1. A magnetic multi-aperture plate device comprising in combination:

a plate member having a central aperture and a plurality of further apertures placed to provide a plurality of magnetic legs;

said member being capable of being magnetized in either of two magnetic remanent states;

a first input winding inductively coupled to a first of said magnetic legs, to establish a first state of magnetic remanence in said device;

a second input winding inductively coupled to a second of said magnetic legs to change the state of magnetic remanence in certain of said magnetic legs;

a third input winding inductively coupled to a further one of said magnetic legs to change the state of magnetic flux therein; separate input means to selectively supply input pulses to the said first, second and third input windings; an output sense winding inductively coupled to an additional magnetic leg to sense a change of flux therein;

said output sense winding being so wound upon said additional magnetic leg with respect to said first, second and third input windings so as to provide an output signal of a first polarity in response to the application of an input signal to said first input winding followed by the application of an input signal to said second input winding and said output sense winding providing an output signal of a second polarity in response to the application of an input signal to said second input winding followed by the application of an input signal to said first input winding.

2. A device as claimed in claim 1, wherein said output sense winding is prevented from providing an output signal upon the concurrent application of input signals to said third input winding and, said second input winding.

3. A device as claimed in claim 1, which further includes a second output sense winding inductively coupled to another magnetic leg to sense a change in the magnetic flux therein:

said second output sense winding providing an output signal in accordance with a change of magnetic flux in said other magnetic leg, regardless of which of said input windings have signals applied to them.

4. A device as claimed in claim 2 which further includes a second output sense winding inductively coupled to another magnetic leg to sense a change of magnetic flux therein:

said second output sense winding providing an output signal in response to a change of flux in said other magnetic leg, regardless of which input windings have signals applied to them.

5. A magnetic multi-aperture plate device comprising in combination:

a plate member having a central aperture and first, second, third, and fourth further apertures, placed to provide a plurality of magnetic legs between said apertures;

said member being capable of being magnetized in either of two magnetic remanent states;

a first input winding threaded through the central aperture and encircling a first and second magnetic leg;

first input means connected to said first input winding to establish a first state of magnetic remanence in said first and second magnetic leg;

a second input winding threaded through said third and fourth apertures and encircling a third magnetic leg;

a second input means connected to said second input winding to change the state of magnetic remanence in a portion of said first and second magnetic legs;

a third input winding threaded through said first and second apertures and encircling a fourth magnetic leg;

a third input means connected to said third input winding to further change the state of magnetic remanence in a portion of said first and second magnetic legs;

a first output sense winding threaded through said second and fourth apertures and encircling a fifth magnetic leg;

and a first output sensing means to sense the resultant state of magnetic remanence in said fifth magnetic leg, said output sense winding being so wound upon said fifth magnetic leg with respect to said first, second and third input windings so as to provide an output of a first polarity if the first and second input windings were actuated successively and to provide an output of a second polarity if the second and first input windings are actuated successively.

6. A device as claimed in claim 5 which includes:

a second output sense winding threaded through said central aperture and said third aperture and encircling a portion of said second magnetic leg;

and a second output sensing means to sense the resultant state of magnetic remanence in the said portion of said second magnetic leg, said output sense winding being so wound upon said second magnetic leg with respect to said first, second and third input windings so as to provide an output under all input conditions whose polarity varies according to the sequence of actuation of said input means.

7. A device as claimed in claim 5, wherein an output of the output sensing means is prevented if the third input winding is actuated at the same time as the second input winding followed by the actuation of the first input winding.

8. A device as claimed in claim 7 which includes a second output sense winding threaded through said central aperture and said third aperture and encircling a portion of said second magnetic leg;

and a second output sensing means to sense the resultant state of magnetic remanence in the said portion of said second magnetic leg, said output sense winding being so wound upon said second magnetic leg with respect to said first, second and third input windings so as to provide an output under all input conditions whose polarity varies according to the sequence of actuation of said input means.

9. A magnetic multi-aperture plate device comprising in combination:

a plate member having a central aperture and a plurality of further apertures placed to provide a plurality of magnetic legs;

said member being capable of being magnetized in either of two magnetic remanent states;

a first input winding inductively coupled to a first of said magnetic legs to establish a first state of magnetic remanence in said device;

a second input winding inductively coupled to a second of said magnetic legs to change the state of magnetic remanence in certain of said magnetic legs;

a third input winding inductively coupled to a third of said magnetic legs to change the state of magnetic remanence in a further one of said magnetic legs;

an output sense winding inductively coupled to an additional magnetic leg to sense a change of magnetic flux therein;

said output sense winding being so wound upon said additional magnetic leg with respect to said first, second and third input windings so as to provide a signal of a first polarity if a signal is applied to said second input winding and a signal of a second polarity if a signal is applied to said third input winding.

10. A device as claimed in claim 9, wherein said output sense winding is prevented from providing any output if signals are concurrently applied to said second and third input windings.

11. A magnetic multi-aperture plate logical "Exclusive-Or" device comprising in combination:

a plate member having a central aperture and a plurality of magnetic legs;

said member being capable of being magnetized in either of two magnetic remanent states;

a first input winding inductively coupled to a first of said magnetic legs to establish a first state of magnetic remanence in said device;

a second input winding inductively coupled to a second of said magnetic legs to change the state of magnetic remanence in certain of said magnetic legs including a first magnetic leg;

a third input winding inductively coupled to a third of said magnetic legs to change the state of magnetic remanence in certain of said magnetic legs including said first magnetic leg;

an output sense winding inductively coupled to said first magnetic leg to sense a change in flux in said first magnetic leg;

said output sense winding being so wound upon said first magnetic leg with respect to said first, second and third input windings so as to provide a signal of a first polarity if an input signal is applied to said second input winding and a signal of a second polarity if an input signal is applied to said third input winding.

12. A device as claimed in claim 11 wherein said output sense means is prevented from providing any output, if signals are concurrently applied to said second and third input windings.

13. A logical gating device, comprising a plurality of magnetic multi-aperture plate devices:

each of said plate devices having a first, second, and third input means, and a first output means;

one of said plate devices further having a second output means;

means to connect all of said output means in series so as to provide a first output if certain of said input means have been sequentially actuated and a second output if others of said input means have been sequentially actuated.

14. A logical gating device comprising a plurality of magnetic multi-aperture plate devices:

each of said plate devices having a first, second, and third input means and first and second output means;

means for selectively connecting the said output means in series to provide a first output if certain of said input means are consecutively actuated and a second output if others of said input means are consecutively actuated.

15. A logical gating device comprising a plurality of magnetic multi-aperture plate devices:

each of said plate devices having a first, second, and third input means and a first output means;

a second output means on a first and a second of said plate devices;

means connecting said first and second output means in series to provide a first output signal upon actuation of a first group of input means and a second output signal upon actuation of a second group of input means.

16. A logical gating device comprising:

three magnetic five-aperture plate devices, capable of being magnetized in either of two magnetic remanent states;

each of said devices having a first, second, and third input means;

means to selectively apply actuating signals to said input windings to establish a first magnetic remanent state in the magnetic legs surrounding said apertures;

a first and second output means responsive to the resultant magnetic remanent state to provide output signals;

means to connect selected output means in series to produce a signal indicative of whether or not the logical requirements of said logical gating device have been satisfied.

17. A logical element comprising a multi-aperture plate, said plate having a central aperture and a plurality of further apertures, arranged with their centers on a line concentric with said central aperture, said center line being so chosen as to place said further apertures an equal distance from said central aperture and the edge of said plate nearest each of said further apertures thus providing a plurality of magnetic legs of equal width, said plate further being capable of remaining in either of two magnetic remanent states; a first input winding inductively coupled to a first one of said magnetic legs and threaded through said central aperture; a first source coupled to said first input winding, said first source being selectively operable to establish a first flux pattern in said plate; a second input winding inductively coupled to a second one of said magnetic legs and threaded through first and second ones of said further apertures; a second source coupled to said second input winding, said second source being selectively operable to change the state of magnetic remanence in certain of said magnetic legs including said first magnetic leg; a third input winding inductively coupled to a third one of said magnetic legs and threaded through third and fourth ones of said further apertures; a third source coupled to said third input winding, said third source being selectively operable to change the state of magnetic remanence certain of said magnetic legs including said first magnetic leg; a first output sense winding inductively coupled to said first magnetic leg and threaded through said second and fourth further apertures to sense a change in flux in said first magnetic leg and first output means coupled to said first output sense winding to produce an output signal of a first polarity upon the selective operation of said second source and said first output means producing an output signal of a second polarity upon the selective operation of said third source.

18. A device as claimed in claim 17, wherein said first output means is ineffective to produce an output signal upon the concurrent selective operation of said second and third sources.

19. A device as claimed in claim 17, further comprising: a second output sense winding inductively coupled to a fourth one of said magnetic legs and threaded through said central aperture and said first of said further apertures to sense a change in flux in said fourth magnetic leg; and a second output means coupled to said second output sense winding to produce an output signal of the same polarity upon the selective operation of said second and said third input sources singly or in combination.

20. A logical element comprising a multi-aperture plate, said plate having a central aperture and a plurality of further apertures, arranged with their centers on a line concentric with said central aperture, said center line being so chosen as to place said further apertures an equal distance from said central aperture and the edge of said plate nearest each of said further apertures thus providing a plurality of magnetic legs of equal width, said plate further being capable of remaining in either of two magnetic remanent states; a first input winding inductively coupled to a first one of said magnetic legs and threaded through said central aperture; a first source coupled to said first input winding said first source being selectively operable to establish a first flux pattern in said plate; a second input winding inductively coupled to a second one of said magnetic legs and threaded through first and second ones of said further apertures; a second source coupled to said second input winding said second source being selectively operable to change the state of magnetic remanence in certain of said magnetic legs including said first magnetic leg; a third input winding inductively coupled to a third one of said magnetic legs and threaded through third and fourth ones of said further apertures; a third source coupled to said third input winding, said third source being selectively operable to change the state of magnetic remanence certain of said magnetic legs including said first magnetic leg; a first output sense winding inductively coupled to said first magnetic and threaded through said second and fourth further apertures to sense a change in flux in said first magnetic leg; and first output means coupled to said first output sense winding to produce an output signal of a first polarity upon the sequential selective operation of said first source followed by said second source and said first output means producing an output signal of a second polarity upon the sequential selective operation of said second source followed by said first source.

21. A device as claimed in claim 20, wherein said first output means is ineffective to produce an output signal upon the sequential selective operation of said first source followed by the concurrent selective operation of said second and said third sources.

22. A device as claimed in claim 21, further comprising: a second output sense winding inductively coupled to a fourth one of said magnetic legs and threaded through said central aperture and said first of said further apertures to sense a change in flux in said fourth magnetic leg; and a second output means coupled to said second output sense winding to produce an output signal of a first polarity upon the selective operation of said first source and said second output means producing an output signal of a second polarity upon the selective operation of said second and third sources whether operated singly or concurrently.

23. A logical "AND" gate comprising a plurality of multi-aperture plates, each of said plates having a central aperture and a plurality of further apertures, arranged with their centers on a line concentric with said central aperture, said center line being so chosen as to place said further apertures an equal distance from said central aperture and the edge of said plate nearest each of said further apertures thus providing a plurality of magnetic legs of equal width, each of said plates further being capable of remaining in either of two magnetic remanent states, each of said plates further having a first input winding inductively coupled to a first one of said magnetic legs and threaded through said central aperture; first source means coupled to said first input winding, said first source means being selectively operable to establish a first flux pattern in said plate; a second input winding inductively coupled to a second one of said magnetic legs and threaded through first and second ones of said further apertures; second source means coupled to said second input winding said second source means being selectively operable to change the state of magnetic remanence in certain of said magnetic legs including said first magnetic leg; a third input winding inductively coupled to a third one of said magnetic legs and threaded through third and fourth ones of said further apertures; third source means coupled to said third input winding, said third source means being selectively operable to change the state of magnetic remanence certain of said magnetic legs including said first magnetic leg; a first output sense winding inductively coupled to said first magnetic leg and threaded through said second and fourth further apertures to sense a change in flux in said first magnetic leg; a second output sense winding on one of said plates, said second output sense winding being inductively coupled to a fourth one of said magnetic legs and threaded through said central aperture and said first of said further apertures to sense a change in flux in said fourth magnetic leg; connecting means for connecting the first output sense winding of each plate and the second output sense winding of said one plate in series; and output means coupled to said series connected sense windings to produce an output upon the selective operation of said third source means followed by the selective operation of said first source means.

24. A logical "AND" gate comprising a plurality of multi-aperture plates, each of said plates having a central aperture and a plurality of further apertures arranged with their centers on a line concentric with said central aperture, said center line being so chosen as to place said further apertures an equal distance from said central aperture and the edge of said plate nearest each of said further apertures thus providing a plurality of magnetic legs of equal width, each of said plates further being capable of remaining in either of two magnetic remanent states each of said plates further leaving a first input winding inductively coupled to a first one of said magnetic legs and threaded through said central aperture; first source means coupled to said first input winding said first source selectively operable to establish a first flux pattern in said plate; a second input winding inductively coupled to a second one of said magnetic legs and threaded through first and second ones of said further apertures; second source means coupled to said second input winding, said second source means being selectively operable to change the state of magnetic remanence in certain of said magnetic legs including said first magnetic leg; a third input winding inductively coupled to a third one of said magnetic legs and threaded through third and fourth ones of said further apertures; third source means coupled to said third input windings, said third source means being selectively operable to change the state of magnetic remanence certain of said magnetic legs including said first magnetic leg; a first output sense winding inductively coupled to said first magnetic leg and threaded through said second and fourth further apertures to sense a change in flux in said first magnetic leg; a second output sense winding on two of said plates each of said second output sense winding being inductively coupled to fourth one of said magnetic legs and threaded through said central aperture and said third further aperture to sense the change in flux in said fourth magnetic leg; connecting means for connecting the first output sense winding of each plate and the two second output sense windings of said two plates in series; and output means coupled to said series connected sense windings to produce an output upon the selective operation of said third source means followed by the selective operation of said first source means.

References Cited by the Examiner

UNITED STATES PATENTS

| | | | |
|---|---|---|---|
| 2,978,176 | 4/1961 | Lockhart | 340—174 |
| 3,017,617 | 1/1962 | Quade | 340—174 |
| 3,030,520 | 4/1962 | Crane | 307—88 |

IRVING L. SRAGOW, *Primary Examiner.*

M. K. KIRK, H. D. VOLK, *Assistant Examiners.*